United States Patent Office 2,744,103
Patented May 1, 1956

2,744,103

SOLID, STABLE DIAZONIUM COMPOUNDS AND PROCESS OF PREPARING THE SAME

Wilhelm Koch, Offenbach am Main, Germany, assignor to Farbwerke Hoechst Aktiengesellschaft vormals Meister Lucius & Bruning, Frankfurt am Main, Germany, a corporation of Germany No Drawing. Application July 1, 1954,
Serial No. 440,839

Claims priority, application Germany July 13, 1953

10 Claims. (Cl. 260—141)

The present invention relates to valuable new solid, stable diazonium compounds and to a process of preparing the same; more particularly it relates to diazonium salts corresponding to the following general formula

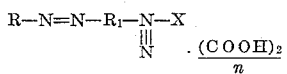

wherein R and R₁ represents radicals of the benzene or naphthalene series, X stands for a chlorine atom or the monovalent radical of oxalic acid and $n$ means one of the numbers 1 or 2.

From Diserens: "Die neuesten Fortschritte in der Anwendung der Farbstoffe," 3rd edition, volume 1, page 573, it is known that the stability of diazo-solutions can be improved by the addition of organic or inorganic acids, for instance oxalic acid, citric acid or phosphoric acid.

Now I have found that solid, stable diazonium compounds are obtained by separating from aqueous solutions of the diazonium chlorides of amino-azo-compounds having the following general formula:

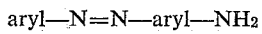

wherein the aryl radicals may contain one or more substituents, the diazonium compounds in solid form by salting out with alkali chlorides after the addition of oxalic acid or the water-soluble salts thereof.

These hitherto unknown diazonium compounds contain oxalic acid bound in a complex form and shall be defined hereafter as diazonium chloride-oxalic acid-addition compounds. They are distinguished by a very good capability to crystallize and are extensively fast to storing due to their good stability. Of special value is their good solubility so that they can advantageously be used in the dyeing and printing industry.

The new compounds are of special commercial interest since in many cases it has hitherto not been possible to obtain from the amino-azo-compounds which are very valuable for dyeing purposes, solid diazonium compounds which in addition to a good stability possess a good solubility.

The diazonium chloride-oxalic acid-addition compounds are precipitated from the aqueous solutions of their diazonium chlorides or their diazonium chloride-zinc double salts after the addition of oxalic acid or the water-soluble salts thereof by salting out with alkali chlorides and they can then be worked up to a dyeing salt with suitable standardizing agents, such as dextrine or alkali chlorides. In the preparation of these new compounds from diazonium chloride-zinc chloride double salts the zinc-oxalate precipitating by the addition of oxalic acid or its salts must be separated from the aqueous solution of the diazonium compound prior to the salting out operation.

In German Patent No. 727,685 is described a process of preparing concentrated diazo-solutions from solid diazonium chloride-zinc chloride double salts, in which aryldiazonium chloride-zinc chloride double salts are reacted with oxalic acid or the salts thereof in the presence of water. According to this process no solid diazonium compounds but diazo-solutions are obtained, the concentration of which is higher than that corresponding to the solubility of the zinc chloride double salts. From the statements of this patent it could not be concluded that diazonium chlorides are capable of forming solid addition compounds with oxalic acid. Therefore, it could not be expected that diazonium chloride-oxalic acid-addition compounds can be separated in a solid form from solutions of diazonium chlorides in the presence of oxalic acid or the salts thereof and alkali chlorides.

The following examples serve to illustrate the invention but they are not intended to limit it thereto, the parts being by weight.

Example 1

220 parts of moist diazonium sulfate from 4-nitro-2-chloro - 3' - methyl-4'-methoxy-6'-amino-1.1'-azobenzene corresponding to 100 parts of the base having a molecular weight of 320.5 are suspended in water and converted into a solution neutral to Congo paper by the addition of a dilute caustic potash solution. By the addition of 35 parts of hydrochloric acid of 20° Bé. an aqueous solution of 30 parts of oxalic acid of the formula

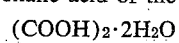

and solid sodium chloride to the filtered solution, the diazonium chloride-oxalic acid-addition compound is separated in the form of red-brown crystals. The diazonium compound is filtered off, it can be dried at 45° C. without the addition of a diluent and worked up with suitable standardizing agents to a dyeing salt.

Example 2

176 parts of the centrifuged diazonium chloride-zinc chloride double salt from 4-nitro-2.6-dichloro-2'.5'-dimethoxy-4'-amino-1.1'azobenzene, corresponding to 100 parts of the base having a molecular weight of 371, are dissolved in water and 67 parts of crystallized oxalic acid are added thereto. The solution of the diazonium compound separated by filtration from the precipitated zinc oxalate is mixed with 15 to 20 per cent of its volume of solid sodium chloride whereby the diazonium chloride-oxalic acid-addition compound precipitates in the form of brown crystals. The diazonium compound so obtained can be worked up with suitable additions to a dyeing salt.

Example 3

100 parts of 4-nitro-1-aminobenzene are diazotized in the usual manner in a hydrochloric acid solution and coupled with 113 parts of 1-amino-2.5-dimethoxybenzene dissolved in dilute hydrochloric acid to form the 4-nitro-2'.5'-dimethoxy-4'-amino-1.1'-azobenzene which is further diazotized in the usual manner. The diazonium chloride solution so obtained is mixed with 60 parts of potassium oxalate, dissolved in 400 parts of water. By slow addition of sodium chloride and simultaneous cooling to 15° C., the diazonium chloride-oxalic acid-addition compound separates from the diazo-solution, stirred with animal charcoal and filtered off, in the form of brown crystals. It is filtered off and worked up with suitable standardizing agents to a dyeing salt.

Example 4

100 parts of 4-aminonaphthalene-1.1'-azo-2'-ethoxybenzene obtained by coupling diazotized 1-amino-2-ethoxybenzene with 1-aminonaphthalene are diazotized in the usual manner. From the diazonium chloride solution so obtained the diazonium chloride of 4-aminonaphthalene-1.1'-azo-2'-ethoxybenzene is precipitated by the addition of sodium chloride, filtered and dissolved in water.

To the diazo-solution purified with animal charcoal there are added 34 parts of crystallized oxalic acid dissolved in 250 parts of water. By slow addition of sodium chloride and simultaneous cooling to about 10° C., the diazonium chloride-oxalic acid-addition compound separates in the form of brown crystals which are filtered off, dried and worked up with suitable standardizing agents to a dyeing salt.

I claim:

1. A process of preparing solid stable diazonium compounds which comprises separating from aqueous solutions of the diazonium chlorides of amino-azo-compounds corresponding to the following general formula:

$$R-N=N-R_1-NH_2$$

wherein R represents a member selected from the group consisting of nitrobenzene, nitrochlorobenzene, nitrodichlorobenzene and ethoxybenzene and $R_1$ represents a member selected from the group consisting of dimethoxybenzene, methylmethoxybenzene and naphthalene, the diazonium compounds in solid form by salting out with alkali chlorides after the addition of a member selected from the group consisting of oxalic acid and the water-soluble salts thereof.

2. A process of preparing solid stable diazonium compounds which comprises separating from aqueous solutions of the diazonium chlorides of amino-azo-compounds corresponding to the following general formula:

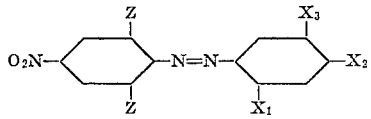

wherein one of the substituents $X_1$ and $X_2$ represents an amino group and the other represents a methoxy group, $X_3$ stands for a member of the group consisting of methyl and methoxy and Z stands for a member of the group consisting of hydrogen and chlorine, the diazonium compounds in solid form by salting out with sodium chloride after the addition of a member selected from the group consisting of oxalic acid and the water-soluble salts thereof.

3. A process as claimed in claim 2, wherein a diazonium chloride of an amino-azo-compound of the following formula is used:

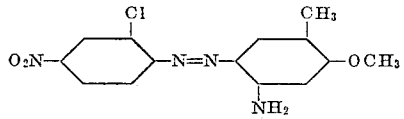

4. A process as claimed in claim 2, wherein a diazonium chloride of an amino-azo-compound of the following formula is used:

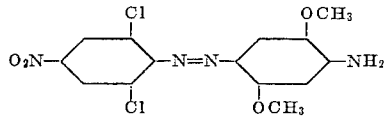

5. The diazonium compounds corresponding to the following general formula:

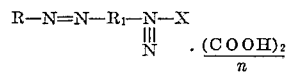

wherein R represents a member selected from the group consisting of nitrobenzene, nitrochlorobenzene, nitrodichlorobenzene and ethoxybenzene, $R_1$ represents a member selected from the group consisting of dimethoxybenzene, methylmethoxybenzene and naphthalene, X stands for a member selected from the group consisting of chlorine and the monovalent radical of oxalic acid, and $n$ means one of the numbers 1 and 2.

6. The diazonium compounds corresponding to the following general formula:

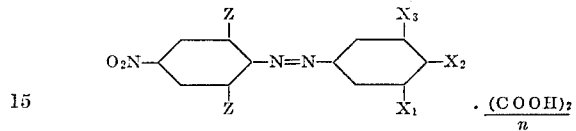

wherein one of the substituents $X_1$ and $X_2$ represents a methoxy group and the other represents the group

Y standing for a member selected from the group consisting of chlorine and the monovalent radical of oxalic acid, $X_3$ stands for a member of the group consisting of methyl and methoxy, Z stands for a member selected from the group consisting of hydrogen and chlorine and $n$ means one of the numbers 1 and 2.

7. The diazonium compound of the following formula:

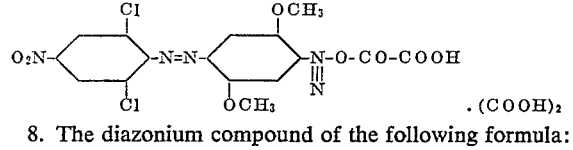

8. The diazonium compound of the following formula:

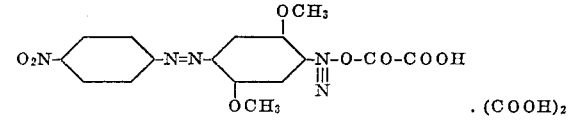

9. The diazonium compound of the following formula:

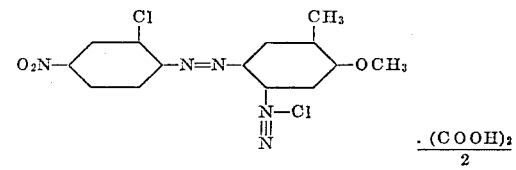

10. The diazonium compound of the following formula:

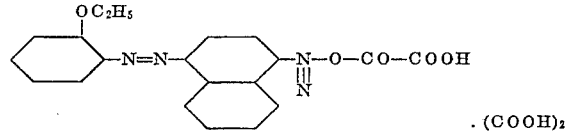

References Cited in the file of this patent

UNITED STATES PATENTS

| | | |
|---|---|---|
| 1,846,150 | Schnitzpahn | Feb. 23, 1932 |
| 2,319,265 | Rossander et al. | May 18, 1943 |

FOREIGN PATENTS

| | | |
|---|---|---|
| 317,355 | Great Britain | Aug. 14, 1929 |
| 865,451 | Germany | Feb. 2, 1953 |